United States Patent [19]
Ward

[11] 3,801,997
[45] Apr. 9, 1974

[54] SPOOL VALVE ASSEMBLY

[75] Inventor: Irving A. Ward, Hacienda Heights, Calif.

[73] Assignee: Modern Faucet Mfg. Co., Los Angeles, Calif.

[22] Filed: Mar. 8, 1971

[21] Appl. No.: 122,045

Related U.S. Application Data

[63] Continuation-in-part of Ser. No. 43,818, June 5, 1970, abandoned.

[52] U.S. Cl. .................................. 4/191, 251/397
[51] Int. Cl. ...................... E03c 1/00, F16k 39/04
[58] Field of Search ....... 4/191, 192, 145, 146, 148, 4/152; 251/297

[56] References Cited
UNITED STATES PATENTS

| | | | |
|---|---|---|---|
| 3,471,872 | 10/1969 | Symmons | 4/145 |
| 3,419,914 | 1/1969 | Moen | 4/191 X |
| 1,930,227 | 10/1933 | Donahue | 4/145 X |
| 2,745,627 | 5/1956 | Winfree | 251/297 |
| 1,100,317 | 6/1914 | Masterson | 251/297 |
| 1,303,140 | 5/1919 | Yeiser | 4/145 X |
| 1,877,510 | 9/1932 | Hughes | 4/145 X |
| 2,701,704 | 2/1955 | Lawrence | 21/297 X |
| 3,656,503 | 4/1972 | Ward | 4/148 |

FOREIGN PATENTS OR APPLICATIONS

| | | | |
|---|---|---|---|
| 503,046 | 3/1939 | Great Britain | 4/191 |
| 1,187,925 | 4/1970 | Great Britain | 4/145 |
| 274,578 | 1/1913 | Germany | 251/297 |

Primary Examiner—Harvey C. Hornsby
Assistant Examiner—Donald B. Massenberg
Attorney, Agent, or Firm—Lyon & Lyon

[57] ABSTRACT

A spool valve assembly is disclosed which is principally useful in diverter spouts and shower heads. A spool valve is operable between two positions to cause two respective flow conditions. Manual movement of the spool valve to the first position when water pressure exists causes a first flow condition, and the valve is maintained in the first position by differential water pressure acting thereon. If the spool valve is not so manually actuated, or water pressure is terminated, the valve assumes a second position under the force of gravity. The valve may be incorporated in a replacable cartridge for use in a diverter spout wherein the first position of operation diverts water to a shower head and the second position supplies a flow of water to a tub. The concepts of the present spool valve also may be incorporated into a self-opening shower head wherein manual movement of the valve to the first position causes a normal spray and termination of water pressure allows the valve to move to a second, or flood, position for draining purposes. Also disclosed is a thermostatically operated spool valve.

8 Claims, 24 Drawing Figures

INVENTOR.
IRVING A. WARD
BY Lyon & Lyon
ATTORNEYS

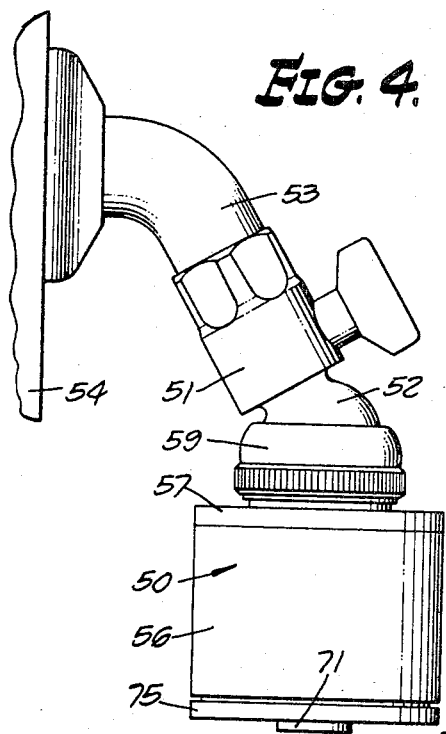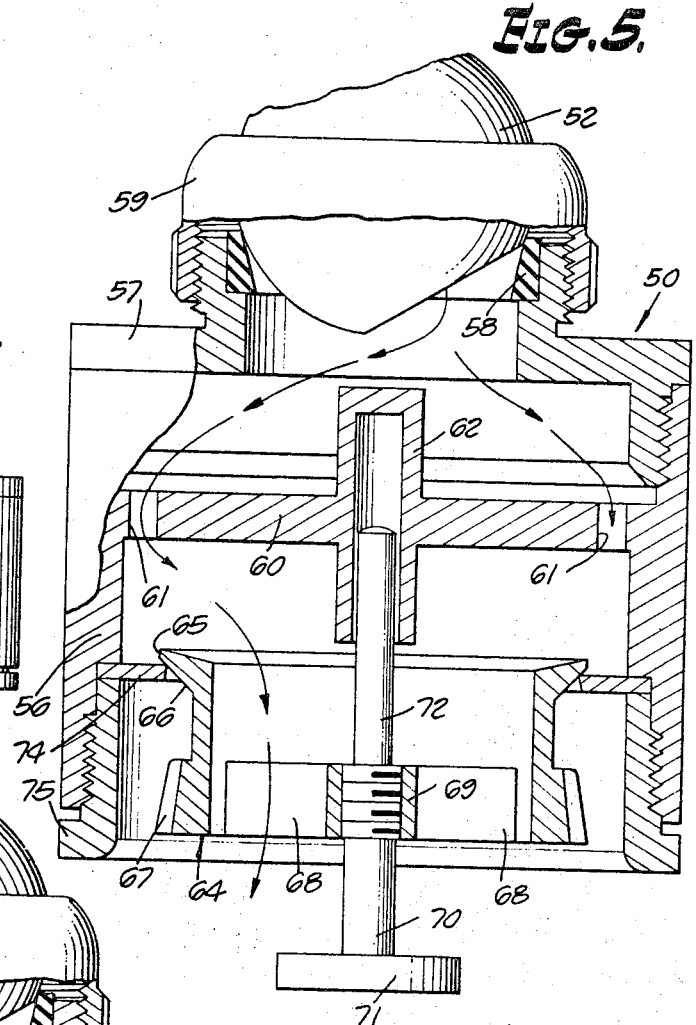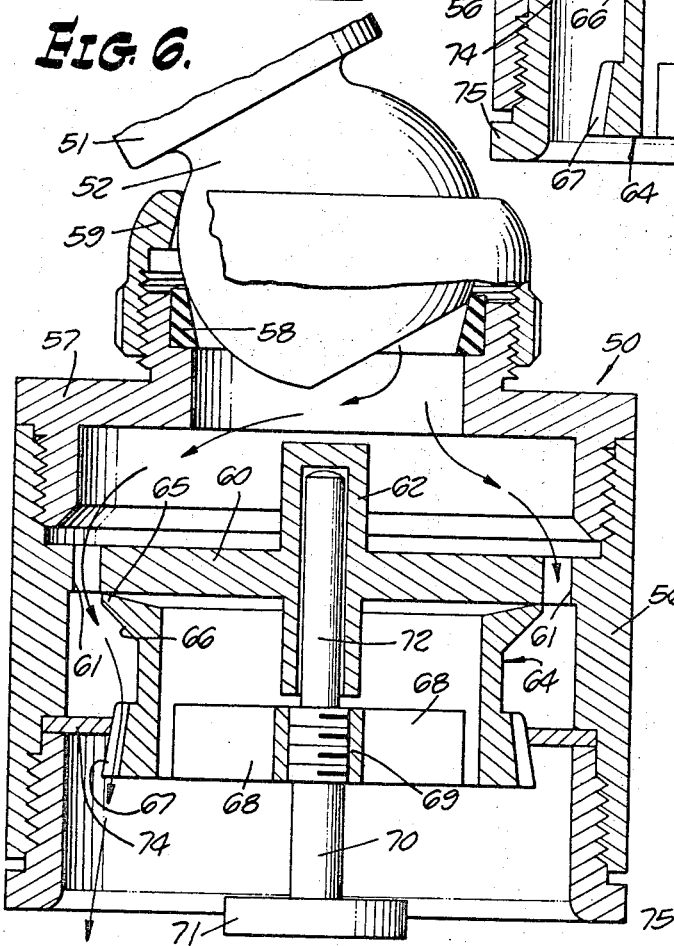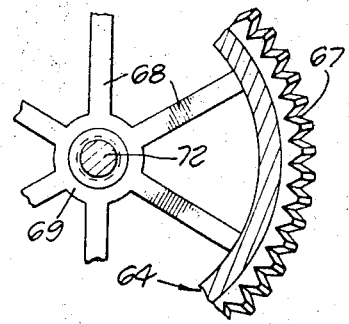

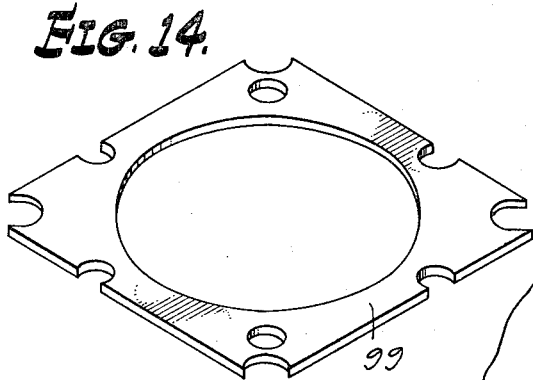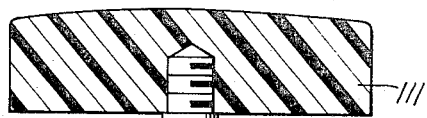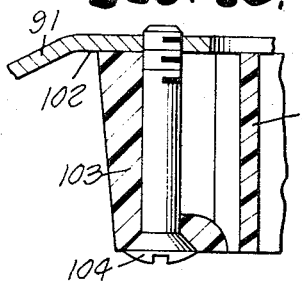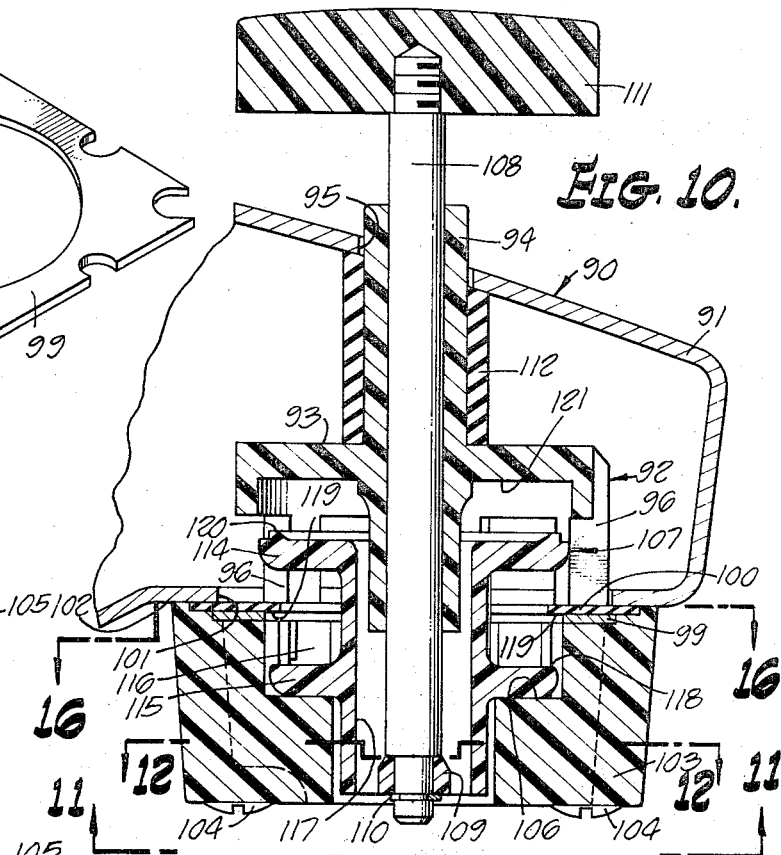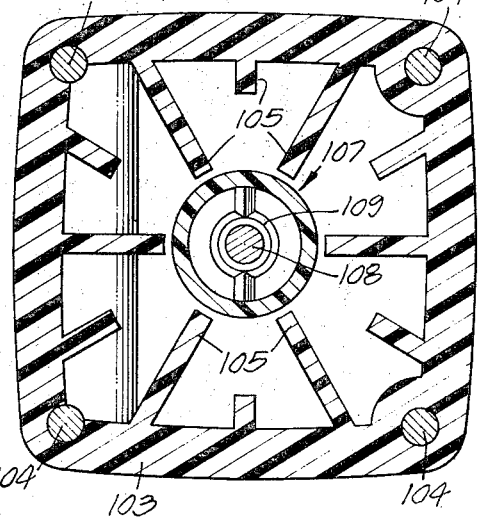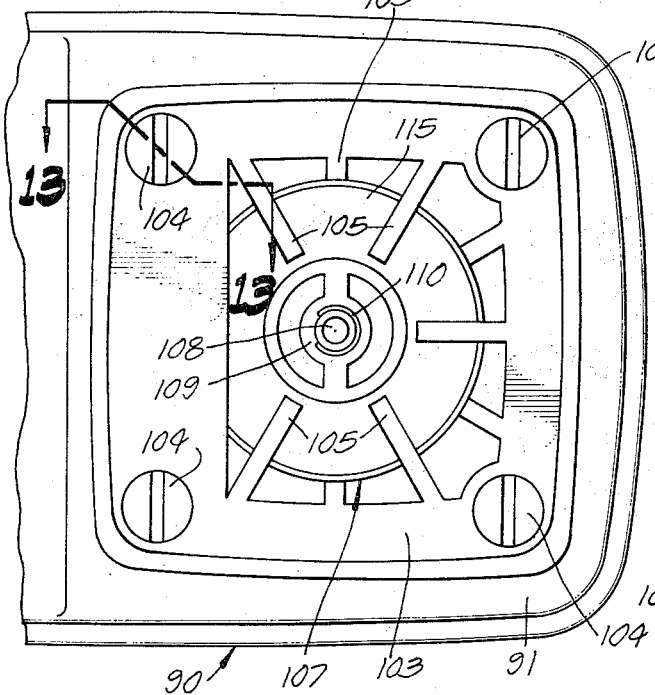

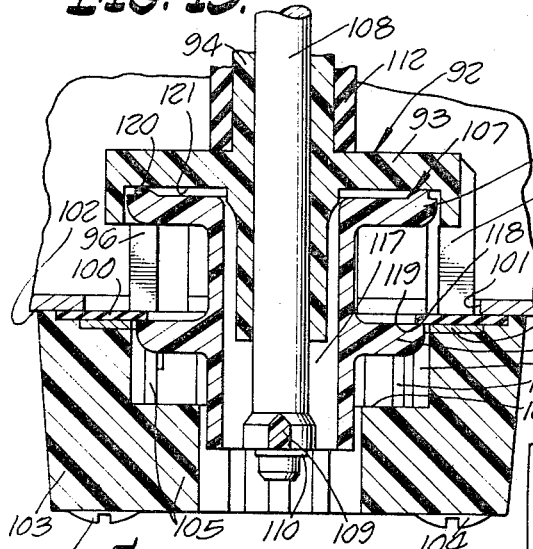
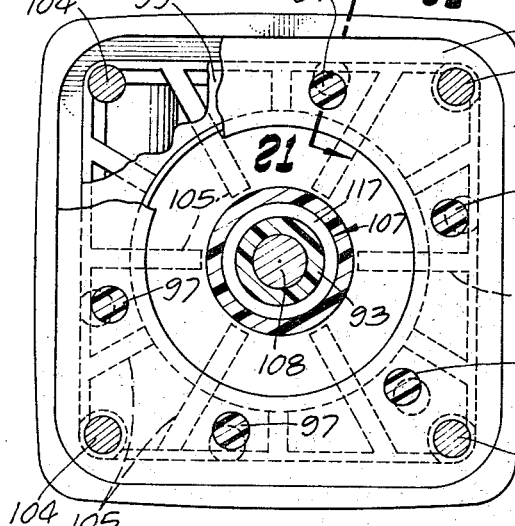
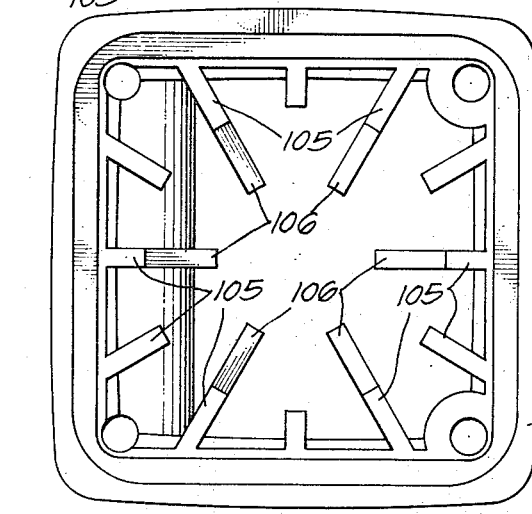
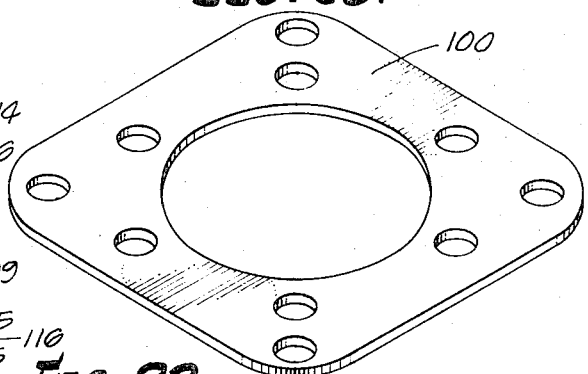
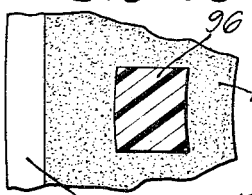
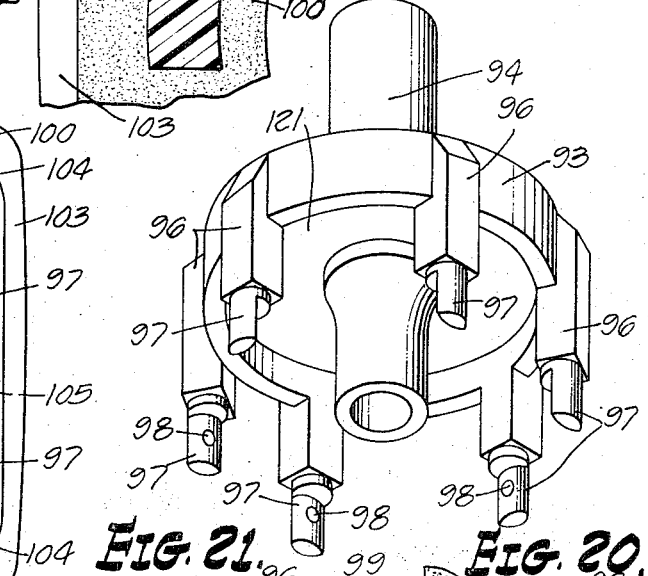
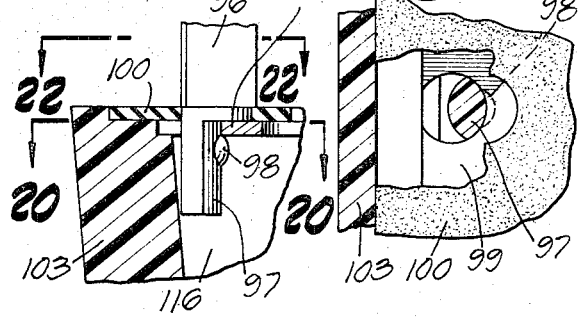
INVENTOR.
IRVING A. WARD
BY
Lyon & Lyon
ATTORNEYS

SPOOL VALVE ASSEMBLY

This application is a continuation-in-part of application Ser. No. 43,818 entitled SPOOL VALVE ASSEMBLY, filed June 5, 1970 (now abandoned).

This invention relates to water spouts, faucets, shower heads and the like, and relates more particularly to an improved valve assembly incorporating a spool valve which is maintained in a predetermined position by differential water pressure acting thereon.

Many valves for providing a diverter action between tub and shower or for providing a self-opening feature for a shower head have been devised in the past. An example of the former involves the use of a flapper gate, and a lift button for operating the same, incorporated in a tub spout of familiar construction. Normally, water flows through the spout into the tub, but by raising the lift button the flapper gate terminates water flow to the tub and causes a flow of water to a shower head. Unfortunately, such devices have been characterized by several disadvantages. For example, if the flapper gate is raised slowly, sometimes the water pressure tends to bind the gate and make it difficult to fully raise the same. Additionally, relatively expensive castings have been required for the spout body because the tolerances between the flapper gate and interior configured surfaces of the spout body must be carefully controlled. Additionally, water sometimes leaks between the lift button stem and spout body.

An example of the latter self-opening shower head typically involves some type of complex spring biased valve arrangement which moves components of the valve structure to an open position upon termination of water flow to allow the remaining water to drain from the head, and which provides a spray pattern when water pressure is present. As is known, it is desirable that the remaining water be drained or flushed out of the head so that no sediment and other water borne materials can lodge within the head, or leave deposits upon evaporation of the water, which tend to clog the head.

Accordingly, it is a principal object of the present invention to provide a novel spool valve assembly for use in spouts, shower heads and the like.

It is an additional object of the present invention to provide a diverting type valve for use in spouts, shower heads, and the like, and which is of relatively simple construction.

It is a further object of this invention to provide a replaceable cartridge spool valve assembly of relatively simple construction for use in a diverter spout.

Another object of this invention is to provide a valve assembly employing a sppol valve wherein a pressure differential maintains the valve in a predetermined position without the necessity of employing resilient biasing members.

An additional object of this invention is to provide a novel self-opening shower head.

A still further object of this invention is to provide a novel thermostatically operated shower head.

These and other objects and features of the present invention will become better understood through a consideration of the following description taken in conjunction with the drawings in which:

FIG. 4 is an elevational view of a self-opening shower head embodying the concepts of the present invention;

FIG. 5 is a cross-sectional view of the shower head of FIG. 4 illustrating the spool valve thereof in a normal flood position;

FIG. 6 is a similar cross-sectional view illustrating the spool valve in a shower or spray position;

FIG. 7 is a fragmentary cross-sectional view of a portion of the spool valve assembly of FIGS. 4 through 6;

Figure 8:
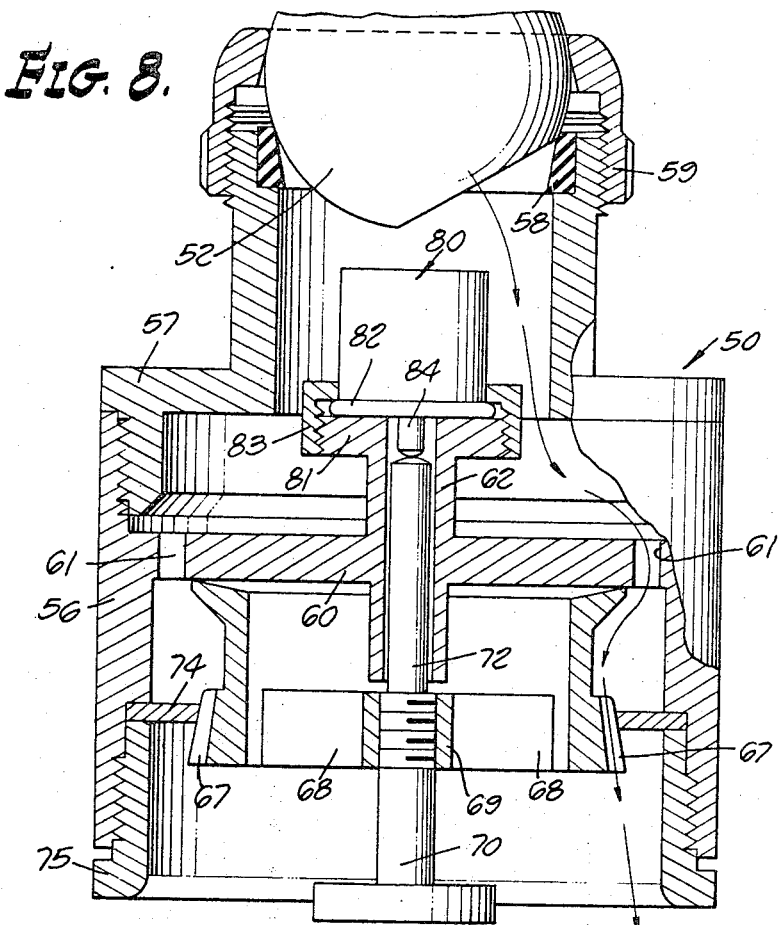
Figure 9:
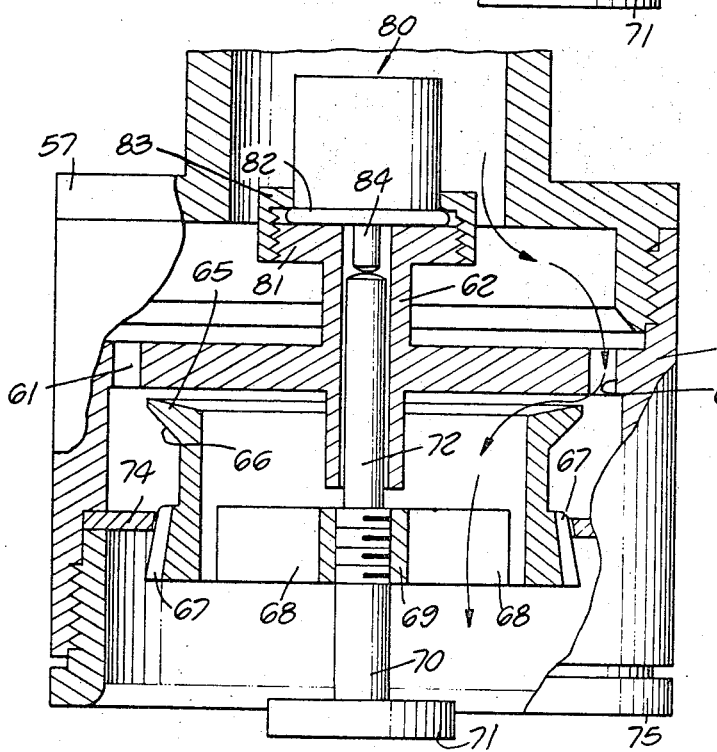

FIGS. 8 and 9 are cross-sectional views of a self-opening shower head similar to the device of FIGS. 4 through 6 but incorporating a thermostatic control element, FIGS. 8 and 9 respectively illustrating the spool valve in shower and flood positions; and FIGS. 10 through 22 illustrate an alternative and preferred construction of a diverter spout assembly in accordance with the present invention.

Figure 1:
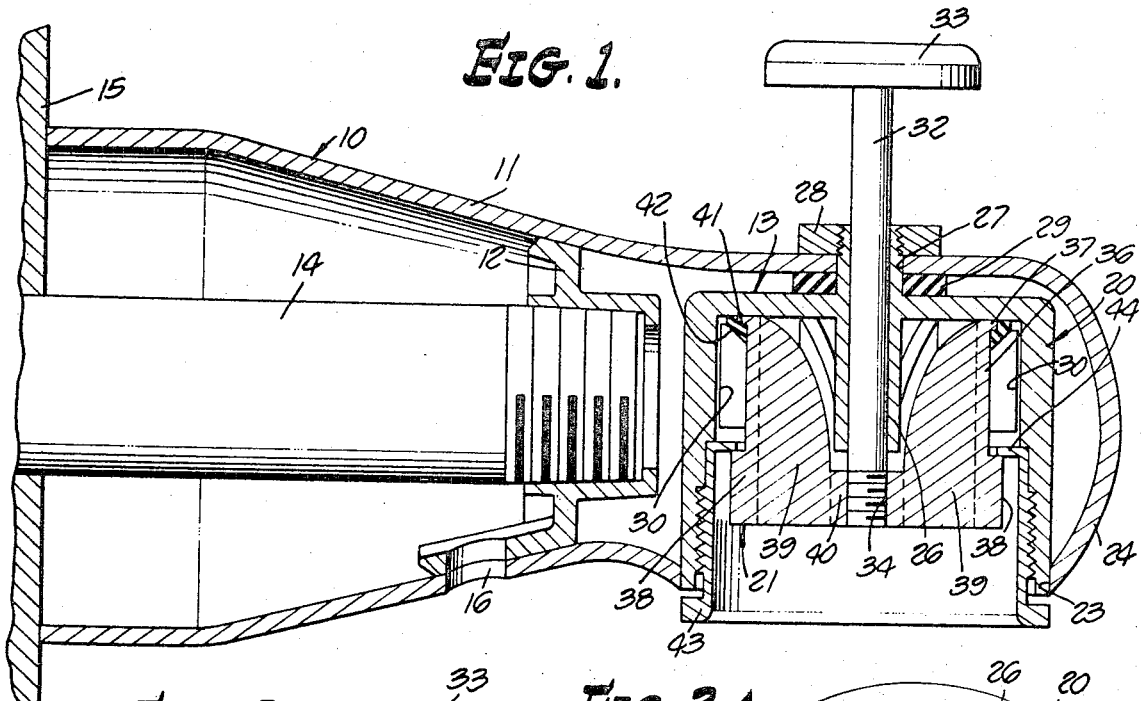
FIG. 1 is a cross-sectional view of a diverter spout incorporating a replaceable cartridge having a spool valve assembly in accordance with the present invention, the spool valve being illustrated in a position wherein water is diverted to a shower.

Turning now to the drawings, FIG. 1 illustrates a diverter spout 10 for tub and shower use including a shell 11 which may be drawn or cast, an interior partition 12 which may be soldered to the interior wall of the shell, and a replaceable cartridge valve assembly 13. As can be seen from FIG. 1, a pipe nipple 14 extends from a wall 15 and is threadably coupled at its outer end with the partition 12. The other end (not shown) of the nipple 14 is coupled with a water supply from an ejector so that in one operative position of the valve cartridge 13 water flows through the valve to the tub and in another operative position water flows to the tub, is blocked, and thus water emanates from an associated shower head (not shown). A drive hole 16 is provided in the shell 11 for a spanner wrench.

Figure 3A:
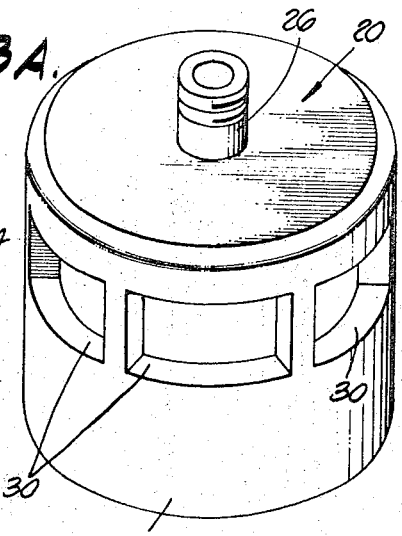
FIGS. 3a through 3c are perspective views of components of the valve assembly of FIG. 1.
Figure 3B:
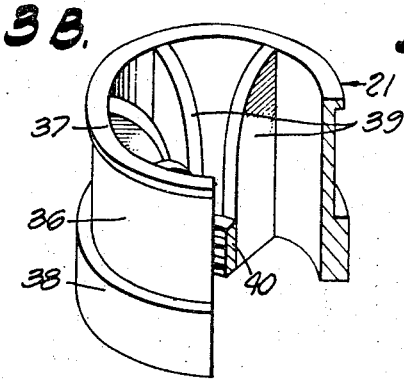
Figure 3C:
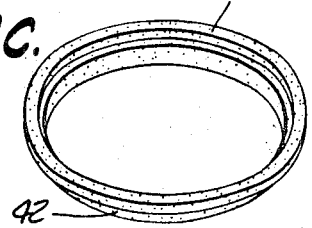

The valve cartridge 13 includes a cage 20 as seen in FIGS. 1 and 3a having mounted therein a spool 21 as best seen in FIGS. 1 and 3b. The cage 20 is cup-shaped, and the lower end 22 thereof is tightly fitted into an opening 23 in the outer end 24 of the shell 11. The cage 20 includes a central tubular portion 26, the upper end of which extends through an opening 27 in the shell 11 and is secured thereto by an internally threaded connector 28. A resilient gasket 29 is interposed between the upper face of the cage 20 and the interior of the shell 11 to provide a seal between the cartridge 13 and shell 11. The cage 20 includes a plurality of openings 30 which allow water to flow from the nipple 14 to the interior of the cage.

The interior of the tubular portion 26 serves as a bushing and guide for a stem 32, the upper end of which is coupled with a lift button 33 and the lower end of which is threadably coupled at 34 with the spool 21. The spool includes a cylindrical body or central portion 36 having an upper flange 37 and lower enlarged portion or flange 38. Stream straightening ribs 39 extend radially inward from the inner surface of the body 36 and serve to provide a straight water flow and to support an internally threaded collar 40 to which the lower end of the stem 32 is secured.

Figure 2:
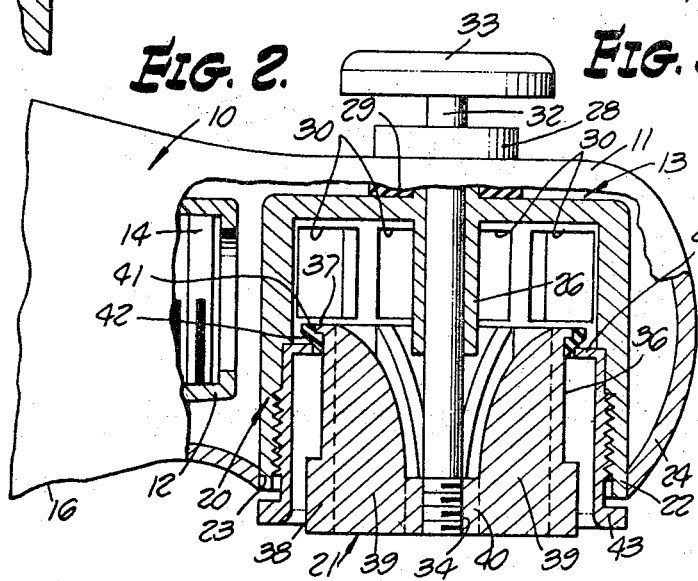
FIG. 2 is a partial perspective view of the device of FIG. 1 illustrating the spool valve in a position to provide flow through the valve to a tub.

A flexible ring 41 having an inclined surface 42 is coupled onto the flange 37 of the spool 21. A cap or insert 43 is threaded into the cage 20 and has an upper flange 44. The upper edge of the flange 44 and inclined surface 42 form mating valve seats, as best seen in FIG. 2, for the assembly to control water flow therethrough. The upper edge of the enlarged portion 38 of the spool 21 cooperates with the lower surface of the flange 44 and limits the upward travel of the spool 21 so that the latter forms a seal with the underside of the cage 20 as best seen in FIG. 1. The ring 41 and the enlarged portion 38 are of different diameters, the ring 41 being larger in diameter, and present different effective areas to the water stream flowing from the pipe nipple 14 into the cage 20. With this arrangement, an appropriate relationship beteen the water pressure acting on the inclined surface 42 and on the enlarged portion 38, as compared to the weight of the spool assembly, is provided. That is, a differential pressure results such that when the spool 21 is manually lifted by the lift button 33 to the position shown in FIG. 1, and with water flowing into the cage 22, the spool 21 is maintained in the upper position as illustrated in FIG. 1 because of the greater pressure acting upwardly on the ring 41. This differential pressure is the result of the different sizes of the face 42 and effective area presented by the portion 38 which in turn determine the hold-up force for the spool. If no water is flowing, the spool 21 is in the normal position shown in FIG. 2. When the water is turned on, the spool remains in this position and water flows to the tub, but when raised as shown in FIG. 1 the ring 41 and upper face of the enlarged portion 38 in combination with the flange 44 prevent water from flowing to the tub and divert water to the shower head. The spool remains in the upper position, but falls under the force of gravity when water flow is terminated. The gravity return of spool 21 to the position seen in FIG. 2 provides a flood position to drain water from the valve assembly upon termination of water flow, thereby reducing ordinary clogging problems.

It should be apparent that the valve cartridge arrangement illustrated in FIGS. 1 and 2 is relatively simple and inexpensive to manufacture. The flexible ring 41 serves to enable assembly of the spool 21 and insert 43, since the upper flange 37 can be made small enough to pass through the opening in the flange 44 and then the ring 41 applied to the flange 37. The ring 41 also serves as a seal as noted above, and the use thereof does not require strict tolerances to be maintained. Additionally, most of the components of the cartridge 13 preferably are made of a suitable plastic material. Thus, typically the cage 20, spool 21, ribs 39 and collar 40 are formed of such material.

FIGS. 4 through 7 illustrate a self-opening shower head employing the concepts of the present invention. The shower head 50 is coupled with a nipple type throttle valve 51 by means of a conventional ball joint 52, the nipple being connected with an inlet pipe 53 extending from a wall 54.

The shower head 50 includes a body 56 threaded onto an upper coupling 57 which, along with packing or a gasket 58, is mounted on the ball joint 52 by means of a coupling nut 59. The body 56 includes an internal partition 60 having a plurality of openings 61 therethrough and having a central tubular guide 62. A spool 64 is mounted within the body 56 and includes an upper flange 65 having a lower inclined surface 66, and has a serrated lower portion 67 to provide a water spray. The interior of the spool 64 may be cylindrical, and a plurality of ribs extend radially inward therefrom terminating in an internally threaded collar 69. The upper end of the stem 70 is coupled with the collar 69, the lower end of the stem 70 having a button 71 affixed thereto. A shaft 72 extends upwardly from the stem 70 and into the guide 62.

A ring 74 is secured within the body 56 by means of a threaded cap 75. The upper edge of the ring 74 and inclined surface 66 of the flange 65 serve as mating valve seats to achieve a flood type flow when in the position shown in FIG. 5. The interior surface of the ring 74 is slightly inclined and cooperates with the serrated portion 67 of the spool 64 to provide a spray pattern when the spool is in the position shown in FIG 6. The ring 74 is a split ring which permits assembly thereof onto the spool 64 intermediate the upper and lower ends of the spool. As was the case with the spool 21 in the embodiment of FIG. 1, the effective areas of the ends of the spool are different. Thus, the effective area of the flange 65 is greater than the effective area of the serrated portion 67 of the spool 64. This results in a differential water pressure acting on the upper and lower portions of the spool 64 and serves to maintain the spool 64 in the upper, or spray, position seen in FIG. 6 after the spool has been manually raised by the button 71 when water is flowing. FIG. 5 illustrates the normal position of the spool 64 to which it falls under the force of gravity. The position shown in FIG. 5 is the initial position of the spool when water is turned on, thereby allowing a flood of water through the interior of the spool 64. When the spool 64 is raised to the position of FIG. 6 with water flowing, the spool remains in this position providing a spray. When water flow is terminated, the spool 64 drops to the position shown in FIG. 5 thereby allowing the head 50 to drain.

Turning to the embodiment illustrated in FIGS. 8 and 9, the shower head is essentially identical in construction to that shown in FIGS. 4 through 7 with the exception of the addition of a thermostatic capsule 80 which is similar to the type employed in automobile cooling systems. Like reference numerals are used in FIGS. 8 and 9 to designate like parts shown in FIGS. 4 through 7. In the embodiment of FIGS. 8 and 9, the guide 62 is provided with an externally threaded flange 81. The thermostatic capsule 80 has a lower flange 82 and the capsule is coupled with the flange 81 by a coupling nut 83. The capsule has a plunger 84 extending downwardly therefrom which moves up or down depending upon the temperature of the capsule 80 as is well known to those skilled in the art. If the temperature of the incoming water is too high, the plunger 84 extends downwardly as illustrated in FIG. 9 thereby preventing the spool 64 from being moved to the full shower position. Likewise, the plunger 84 moves the spool 64 downwardly upon a temperature increase in the event the spool was already in the shower position.

From the foregoing, it will be apparent that the spool valve assembly of the present invention has both a normal flood or flow position as well as a diverter or shower position, and that the same requires no spring or biasing members nor the usually required packing therein which serve to simplify construction. The weight of the spool and manual force are employed to activate the spool between its two positions. The shower head arrangement provides certain safety and convenience features because the normal position creates a solid low velocity stream which drops straight down from the head preventing an accidental shower until the spool is manually moved.

Additionally, when the spool assembly is used in connection with a lift button spout, it obviates an accidental shower. The present construction permits tempering the water before the shower pattern is activated, and the shower head drains and flushes after each use thereby eliminating prolonged dripping and contaminants which tend to collect in the spray endings. It will be apparent that the spool-shaped hollow plug can, by small changes in diameter differences between the flanged ends, be adjusted and manufactured to accommodate any weight material and still hold the shower position at any desired water pressure.

The thermostatic element arrangement has certain desirable features as noted above. If the shower water reaches a given temperature, for example 110° F, the spool cannot then be placed in the shower position, or if in the shower position, the spool will automatically return to the flood position. This will prevent body scalding and also permit the bather to retemper the water before activating to the shower position.

Turning now to the diverter spout embodiment illustrated in FIGS. 10 through 22, the diverter spout 90 includes a shell 91 having a suitable configuration and a preferred form of diverter cartridge assembly 92. Water is supplied into the shell 91 in the same manner as with the arrangement shown in FIG. 1. The valve cartridge 92 includes a cage 93 as seen best in perspective in FIG. 19. The cage has an upper end 94 which extends through an aperture 95 in the shell 91. The lower end of the cage includes a plurality of depending fingers 96 terminating in pins 97, each of which has a spherical protrusion 98 thereon. The fingers 96 extend into apertures in a metal support plate 99 and the protrusions 98 serve to lock the cage with the support plate as best seen in FIG. 17. A gasket 100 is positioned above the plate 99, and the outer edge of the gasket provides a seal at an aperture 101 through the lower surface of the shell 91.

A spout outlet 103 is mounted below the plate 99. The outlet 103, plate 99 and gasket 100 are secured to the lower surface 102 of the shell 91 by a plurality of screw fasteners 104 which are threaded into the lower surface 102 of the shell. The spout outlet 103 includes a plurality of inwardly radiating ribs 105 as best seen in FIG. 12 which serve as straighteners to provide a straight water flow. Surfaces 106 on the longer ribs also serve as a stop for a movable spool 107 of the valve. A stem 108 is coupled with the lower end 109 of the spool 107 by means of a snap retaining ring 110, and the upper end of the stem is coupled with a lift button 111. Tubular packing of suitable plastic or rubber material 112 is mounted on the upper end 94 of the cage 93 and bears tightly against the shell 91 at the aperture 95 to provide an upper seal.

The spool 107 is in the shape of a spool and includes an upper flange 114 and a lower flange 115. The upper flange 114 has a larger diameter than does the lower flange 115. For example, the upper flange may have a diameter of 1.07 inches and the lower flange 115 may have a diameter of 1 inch. When the spool 107 is in the position shown in FIG. 10, water flows through the shell, to the cage 93 and through the interior 116 of the outlet 103, and through a chamber 117 in the spool 107 to the associated tub or the like. When the spool 107 is raised by means of the lift button 111 to the position shown in FIG. 15, the upper edge 118 of flange 115 of the spool 107 seals with the lower inner edge 119 of the gasket 100. Additionally, the upper raised annular edge 120 of the upper flange 114 seals within the cup portion 121 of the cage 93. This action prevents water from flowing through the outlet 103 to the associated tub or the like, and causes water to be diverted to a shower head or the like. The spool 107 remains in the upper position shown in FIG. 15 as a result of the differential pressure acting on the flanges 114 and 115. Thus, with water flowing into the cage 93, the spool 107 is maintained in the upper position as illustrated in FIG. 15 because of the greater pressure acting upwardly on the larger flange 114. If no water is flowing, the spool 107 is in the normal position shown in FIG. 10. When the water is turned on, the spool remains in the normal position and water flows to the tub, but when raised as shown in FIG. 15 water is prevented from flowing to the tub and diverts to the shower head. The spool 107 remains in the upper position, but falls to the normal position under the force of gravity when water flow is terminated. The gravity return of the spool provides a flood position to drain water from the valve assembly upon termination of water flow, thereby reducing the usual clogging problems.

The valve assembly illustrated in FIGS. 10 through 22 is relatively simple and inexpensive to manufacture. The shell 91 may be formed of any suitable material, typically metal. Preferably, the plate 99 and stem 108 are formed of stainless steel. The cage 93, spout outlet 103 and spool 107 may be formed of a plastic material, such as that sold under the tradename Delrin.

It further should be noted that the spool valve assembly of the present invention can also be incorporated into a typical kitchen type spray valve. The spray valve thus would have the features of being button controlled, would require no packing, would be self-cleaning, and would be self-flushing with no after drip. Additionally, a double spray pattern would be available; that is, a flood position for filling glasses or to provide a solid stream for other uses such as rinsing, and a second pattern in the form of a spray stream for cleaning vegetables, and so forth.

The present embodiments of this invention are to be considered in all respects as illustrative and not restrictive, the scope of the invention being indicated by the appended claims rather than the foregoing description, and all changes which come within the meaning and range of equivalency of the claims therefore are intended to be embraced therein.

What is claimed is:

1. A spool valve assembly comprising
a housing having an inlet adapted to be coupled to a fluid supply and having an outlet,
ring means coupled with said housing and forming a valve seat, said ring means extending into said outlet,
spool valve means mounted for movement within said housing to control the flow of fluid therethrough and from said inlet to said outlet, said spool valve means being positioned in said ring means and including first and second enlarged end portions and a cylindrical central portion therebetween, said central portion having a flow opening therethrough, the first end portion of said spool valve means having a larger effective area than the second end portion thereof to enable said spool valve means to be maintained in a first position in said housing by fluid pressure acting upon said first and second portions thereof, said spool valve means having a plurality of rib members inwardly directed toward the axis of said spool valve means and mounted on the inside of the cylindrical wall of said spool valve means in said flow opening to affect the direction of flow of fluid through said spool valve means, said spool valve means having a weight sufficient to cause the same to move to a second position in said housing upon a predetermined decrease in the fluid flow through said inlet and said housing, and manual actuator means coupled with said spool valve means and extending from said shell for enabling manual actuation of said spool valve means to said first position.

2. An assembly as in claim 1 wherein
said first end portion comprises a flange having a resilient member thereon, the effective diameter of said resilient member being greater than the effective diameter of said second end portion.

3. An assembly as in claim 1 wherein
the first end portion of said spool valve means includes an inclined surface which normally engages said ring means, and the second end portion thereof is serrated, said second end portion cooperating with said ring means to provide a spray pattern when said spool valve means is in said first position.

4. An assembly as in claim 1 including
thermostatic means coupled between said housing and said spool valve means, said thermostatic means having a member movable in response to temperature changes in the fluid supplied to said assembly for engaging and preventing said spool valve means from being moved to said first position.

5. A spool valve assembly for use in a diverter type spout, and the like, having a shell for receiving said assembly, comprising
a housing in the form of a cage of generally cup-shaped configuration mountable within said shell for receiving fluid from a fluid supply, said housing having an internal chamber and a plurality of openings therethrough through which fluid can flow, ring means coupled with said housing and forming a valve seat, said ring means extending into said chamber, spool valve means positioned within said chamber of said housing and mounted substantially coaxial with said ring means for movement in said chamber for controlling fluid flow through said assembly and from said inlet to said outlet, said spool valve means including an upper flange, a lower flange and a cylindrical central portion extending between said flanges said central portion having a flow opening therethrough and being of lesser diameter than said flanges, the upper flange of said spool valve means having a larger effective area than said lower flange thereof to cause said spool valve means to be maintained in a first upper position in said chamber by fluid pressure acting upon said upper and lower flanges, said spool valve means being mounted for free movement within said chamber and having a weight sufficient to cause the same to move to a second lower position upon a predetermined decrease in fluid pressure on said flanges to thereby enable said upper flange to engage said ring means, and said spool valve means including a plurality of rib members inwardly directed toward the axis of said spool valve means and mounted on the inside of the cylindrical wall of said spool valve means in said flow opening to affect the direction of flow of fluid through said spool valve means and manual actuator means coupled with said spool valve means and extending from said shell for enabling manual actuation of said spool valve means to said first position.

6. An assembly as in claim 5 wherein
said upper flange of said spool valve means comprises an enlarged portion thereon and a resilient ring member, said resilient ring member having an inclined surface for engaging said ring means when said spool valve means moves to said second lower position.

7. A spool valve assembly for use in a diverter type spout, and the like, having a shell for receiving said assembly, comprising,
cage means having a generally cup-shaped configuration and a plurality of fingers depending therefrom and being mountable within said shell, spout outlet means for providing a fluid outlet, a plurality of rib members carried by said outlet means and inwardly directed toward the axis of said spout outlet means to affect the direction of flow of fluid therethrough from an inlet to said outlet, support plate means coupled with said depending fingers of said cage means, said support plate means being coupled with said spout outlet means, said support plate means providing a valve seat, and spool valve means positioned within said housing and mounted substantially coaxial with said valve seat for movement within said housing for controlling fluid flow through said assembly, said spool valve means including an upper flange, a lower flange, and a central portion between said flanges of lesser diameter than said flanges, the upper flange of said spool valve means having a larger effective area than said lower flange thereof to cause said spool valve means to be maintained in a first upper position within said housing by fluid pressure acting upon said upper and lower flanges, said spool valve means being mounted for free movement within said housing and having a weight sufficient to cause the same to move to a second lower position upon a predetermined decrease in fluid pressure on said flanges.

8. A spool valve assembly as in claim 7 wherein
said support plate means includes a support plate having a plurality of apertures therein and includes a resilient gasket forming said valve seat, said depending fingers of said cage means being snap-coupled with said apertures in said plate.

* * * * *